US012677314B2

(12) United States Patent
Lin et al.

(10) Patent No.: US 12,677,314 B2
(45) Date of Patent: Jul. 7, 2026

(54) METHODS OF PRIORITIZED TWO-STEP RANDOM ACCESS CHANNEL (RACH) IN NEW RADIO (NR)

(71) Applicant: Telefonaktiebolaget LM Ericsson (publ), Stockholm (SE)

(72) Inventors: Zhipeng Lin, Nanjing (CN); Yufei Blankenship, Kildeer, IL (US); Robert Mark Harrison, Grapevine, TX (US); Jan Christoffersson, Luleå (SE); Henrik Enbuske, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 859 days.

(21) Appl. No.: 17/607,598

(22) PCT Filed: May 4, 2020

(86) PCT No.: PCT/SE2020/050444
§ 371 (c)(1),
(2) Date: Oct. 29, 2021

(87) PCT Pub. No.: WO2020/222698
PCT Pub. Date: Nov. 5, 2020

(65) Prior Publication Data
US 2022/0210826 A1 Jun. 30, 2022

Related U.S. Application Data

(60) Provisional application No. 62/842,131, filed on May 2, 2019.

(51) Int. Cl.
*H04W 74/00* (2009.01)
*H04W 74/0833* (2024.01)
(Continued)

(52) U.S. Cl.
CPC ..... *H04W 74/006* (2013.01); *H04W 74/0833* (2013.01); *H04W 74/0836* (2024.01); *H04W 74/0838* (2024.01)

(58) Field of Classification Search
CPC ........... H04W 74/006; H04W 74/0833; H04W 52/362; H04W 52/50; H04W 74/0836
See application file for complete search history.

(56) References Cited

U.S. PATENT DOCUMENTS

2018/0279375 A1     9/2018  Jeon et al.
2018/0317264 A1 * 11/2018  Agiwal ................. H04W 52/36
2019/0059113 A1 *  2/2019  He .................... H04W 74/0875

FOREIGN PATENT DOCUMENTS

EP          3952485 A1 *  2/2022  .......... H04W 52/146
WO      2018127226 A1     7/2018
WO      2018171365 A1     9/2018

OTHER PUBLICATIONS

International Search Report and Written Opinion dated Jul. 23, 2020 for International Application No. PCT/SE2020/050444 filed May 4, 2020, consisting of 12-pages.

(Continued)

*Primary Examiner* — Cheikh T Ndiaye
(74) *Attorney, Agent, or Firm* — Weisberg I.P. Law, P.A.

(57) ABSTRACT

A method, system, network node and wireless device are disclosed. In one or more embodiments, A network node configured to communicate with a wireless device is provided. The network node includes processing circuitry configured to transmit a first configuration for prioritized 2-step random access, RA, signaling where the first configuration includes at least a power ramping step and is separately configured from a second configuration for RA signaling, and perform the prioritized 2-step RA signaling based on the power ramping step of the first configuration.

14 Claims, 8 Drawing Sheets

(51) Int. Cl.
H04W 74/0836 (2024.01)
H04W 74/0838 (2024.01)

(56) References Cited

OTHER PUBLICATIONS

3GPP TSG RAN Meeting #82 RP-182894; Title: New work item: 2-step RACH for NR; Agenda Item: 9.1.1; Source: ZTE Corporation, Sanechips; Document for: Approval; Date and Location: Dec. 10-13, 2018, Sorrento, Italy, consisting of 5-pages.

ETSI TS 138 321 V15.5.0; 5G; NR; Medium Access Control (MAC) protocol specification (3GPP TS 38.321 version 15.5.0 Release 15), May 2019, consisting of 80-pages.

3GPP TSG RAN WG1 Meeting #96bis R1-1903924; Title: Further discussion on 2-step RACH procedure; Agenda tem: 7.2.1.2; Source: Huawei, HiSilicon; Document for: Discussion and decision; Date and Location: Apr. 8-12, 2019, Xi'an, China, consisting of 4-pages.

3GPP TSG RAN WG1 Meeting #96bis R1-1904716; Title: On 2-step RACH Procedure; Agenda Item: 7.2.1.2; Source: Nokia, Nokia Shanghai Bell; Document for: Discussion and Decision; Date and Location: Apr. 8-12, 2019, Xi'an, China, consisting of 16-pages.

3GPP TSG RAN WG1 Meeting #97 R1-1906125; Title: Discussion on 2-step RACH procedure; Agenda Item: 7.2.1.2; Source: Vivo; Document for: Discussion and Decision; Date and Location: May 13-17, 2019, Reno, USA, consisting of 8-pages.

Japanese Office Action and English Summary dated May 16, 2023 for Application No. 2021-564094, consisting of 8 pages.

3GPP TSG RAN WG1 Meeting #96 R1-1902534; Title: Discussion on 2Step RACH Procedure; Agenda Item: 7.2.1.2; LG Electronics; Document for: Discussion and Decision; Location and Date: Athens, Greece Feb. 12-16, 2019, consisting of 8 pages.

Japanese Office Action and English Summary dated Jan. 10, 2023 for Application No. 2021-564094, consisting of 12 pages.

3GPP TS 38.331 V15.5.0; 3rd Generation Partnership Project; Technical Specification Group Radio Access Network; NR; Radio Resource Control (RRC) protocol specification (Release 15), Mar. 2019, consisting of 491 pages.

* cited by examiner

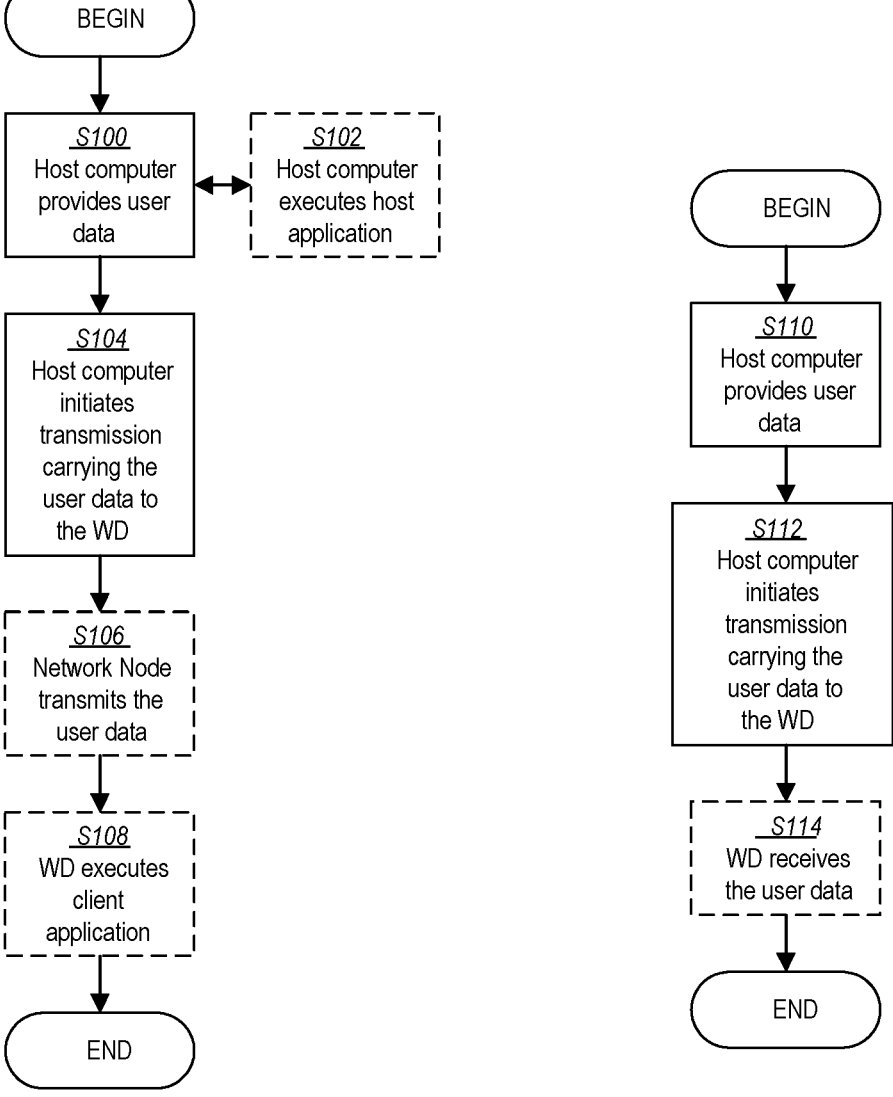
FIG. 5                                    FIG. 6

METHODS OF PRIORITIZED TWO-STEP RANDOM ACCESS CHANNEL (RACH) IN NEW RADIO (NR)

CROSS-REFERENCE TO RELATED APPLICATIONS

This application is a Submission Under 35 U.S.C. § 371 for U.S. National Stage Patent Application of International Application No.: PCT/SE2020/050444, filed May 4, 2020 entitled "METHODS OF PRIORITIZED TWO-STEP RADIO ACCESS CHANNEL (RACH) IN NEW RADIO (NR)," which claims priority to U.S. Provisional Application No. 62/842,131, filed May 2, 2019, entitled "METHODS OF PRIORITIZED TWO-STEP RADIO ACCESS CHANNEL (RACH) IN NEW RADIO (NR)," the entireties of both of which are incorporated herein by reference.

TECHNICAL FIELD

Wireless communication and in particular, to prioritized 2-step random access channel (RACH) signaling.

BACKGROUND

Ultra reliable and low latency communications (URLLC), 2-step random access (RA) in New Radio (NR) Release-16 (i.e., third generation partnership project (3GPP) Release-16) and the power reduction priority in NR release 15 are discussed below. NR is also referred to as "5G".

URLLC Service

Ultra-reliable and low latency communication (URLLC) is one of a category of use cases of NR. URLLC relates to services for latency sensitive devices for applications such as factory automation, electrical power distribution, and remote driving, etc. URLLC may have strict requirements regarding transmission reliability and latency, for example, 99.9999% reliability within 1 ms one-way latency may be required. In NR Release (Rel)-15 (also referred to as 3GPP Release 15), several new features and enhancements were introduced to support one or more of these requirements. In NR Rel-16, standardization works focused on further enhancing URLLC system performance as well as ensuring reliable and efficient coexistent of URLLC and other NR use cases.

One type of NR internet of things (NR-IoT) device may handle communication for multiple service types, e.g., periodic URLLC type robot control messages, URLLC type of occasional alarm signals (for which periodic resources may need to be configured), occasional sensor data transmission, other mobile broadband (MBB) type traffic such as occasional video transmissions or software updates. This may lead to a traffic mix that may be multiplexed by the wireless device for UL transmissions, i.e., lead to a communication traffic mix on MAC multiple logical channels with different priorities that may need to be configured.

When a mix of traffic is present in the channel simultaneously, URLLC type of traffic may need to be treated with higher priority such as due to its low latency requirements. For example, inter-wireless device prioritization where the URLLC wireless device's transmission is prioritized over an eMBB wireless device's transmission is being studied for definition in 3GPP Rel-16. Furthermore, intra-wireless device prioritization/multiplexing is also being defined in 3GPP Rel-16, where the URLLC transmission can pre-empt the eMBB transmission of the same wireless device.

In addition to the control and data channels after radio resource control (RRC) connection, the random access procedure for supporting high-reliability low-latency traffic may need to have prioritized treatment as well.

2-Step RA and 4-Step RA in NR, i.e., Normal/Common RA Signaling in NR 4 Step RA Procedure in NR A 4-step approach may be used for the random access procedure where the 4 step approach is illustrated in FIG. 1. In this approach, the wireless device detects a synchronization signal (SS) and decodes the broadcasted system information, followed by transmitting a PRACH preamble (message 1) in the uplink. The network node (e.g., gNB) replies with a RAR (Random Access Response, message 2). The wireless device then transmits a wireless device identification (message 3) on PUSCH.

The wireless device transmits PUSCH (message 3) after receiving a timing advance command in the RAR, allowing PUSCH to be received with a timing accuracy within the cyclic prefix. Without this timing advance, a very large cyclic prefix (CP) may be needed in order to be able to demodulate and detect PUSCH, unless the system was applied in a cell with very small distance between wireless device and network node. Since NR may also support larger cells with a need for providing a timing advance to the wireless device the 4-step approach may be needed for random access procedure.

2-Step RACH Work Item for 3GPP Release 16

A 2-step RACH work item has been approved at for further study.

Completing the initial access in only two steps IS illustrated in FIG. 2 and as described below:

Step 1: wireless device sends a message A including random access preamble together with higher layer data such as RRC connection request possibly with some small payload on PUSCH;

Step 2: The network node sends RAR (referred to as message B) including a wireless device identifier assignment, timing advance information, and contention resolution message etc.

Non-Prioritized 4-Step RACH

The information element (IE) random access channel (RACH)-ConfigGeneric may be used to specify the random-access parameters both for regular random access as well as for beam failure recovery.

RACH-ConfigGeneric Information Element

```
-- ASN1START

-- TAG-RACH-CONFIGGENERIC-START

RACH-ConfigGeneric ::=          SEQUENCE {
    prach-ConfigurationIndex          INTEGER (0..255),
    msg1-FDM                          ENUMERATED {one, two, four, eight},
    msg1-FrequencyStart               INTEGER (0..maxNrofPhysicalResourceBlocks-1),
    zeroCorrelationZoneConfig         INTEGER(0..15),
```

-continued

| preambleReceivedTargetPower | INTEGER (−202..−60), |
| preambleTransMax | ENUMERATED {n3, n4, n5, n6, n7, n8, n10, n20, |
| n50, n100, n200}, | |
| powerRampingStep | ENUMERATED {dB0, dB2, dB4, dB6}, |
| ra-ResponseWindow | ENUMERATED {sl1, sl2, sl4, sl8, sl10, sl20, |
| sl40, sl80}, | |
| ... | |

```
}
-- TAG-RACH-CONFIGGENERIC-STOP
-- ASN1STOP
```

If a 4-step RACH is not prioritized, the power ramping step size is according to the powerRampingStep in RACH-ConfigGeneric IE, see 3GPP technical specification (TS) 38.321 text below:

1>set PREAMBLE_POWER_RAMPING_STEP to powerRampingStep;

The scaling factor for backoff indicator is set to 1, see 3GPP TS 38.321 text below:

1>set SCALING_FACTOR_BI to 1;

Backoff Parameter values are presented in Table 7.2-1 of 3GPP TS 38.321 which is reproduced below.

TABLE 7.2-1

Backoff Parameter values.

| Index | Backoff Parameter value (ms) |
|---|---|
| 0 | 5 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |
| 12 | 960 |
| 13 | 1920 |
| 14 | Reserved |
| 15 | Reserved |

Prioritized 4-Step RACH in NR Rel-15 (i.e., 3GPP Rel-15)

In 3GPP Rel-15, prioritized RACH can be configured for the 4-step RACH. The prioritized RACH is applicable to a random access procedure initiated for beam failure recovery or for handover.

The IE RA-Prioritization may be used to configure prioritized random access.

RA-Prioritization Information Element

RA-Prioritization field descriptions powerRampingStepHighPrioritiy

Power ramping step applied for prioritized random access procedure.

scalingFactorBI

Scaling factor for the backoff indicator (BI) for the prioritized random access procedure. (see wireless communication protocols such as 3GPP TS 38.321, clause 5.1.4). Value zero corresponds to 0, value dot25 corresponds to 0.25 and so on.

However, there is no standardization for the prioritized 2-step RACH.

SUMMARY

Some embodiments advantageously provide methods, systems, and apparatuses for prioritized 2-step random access channel (RACH) signaling.

The present disclosure provides for different methods of prioritizing the 2-step RACH msgA, where the msgA is composed of the random access preamble part and the PUSCH part.

According to one aspect of the disclosure, a network node configured to communicate with a wireless device is provided. The network node includes processing circuitry configured to: transmit a first configuration for prioritized 2-step random access, RA, signaling where the first configuration includes at least a power ramping step and is separately configured from a second configuration for RA signaling, and perform the prioritized 2-step RA signaling based on the power ramping step of the first configuration.

According to one or more embodiments of this aspect, the power ramping step of the first configuration has a larger power step size than a power step size of the second configuration. According to one or more embodiments of this aspect, the RA signaling associated with the second configuration is one of 4-step RA signaling and 2-step RA signaling. According to one or more embodiments of this

```
-- ASN1START
-- TAG-RA-PRIORITIZATION-START
RA-Prioritization ::=              SEQUENCE {
    powerRampingStepHighPriority      ENUMERATED {dB0, dB2, dB4, dB6},
    scalingFactorBI                   ENUMERATED {zero, dot25, dot5, dot75}
OPTIONAL, -- Need R
    ...
}
-- TAG-RA-PRIORITIZATION-STOP
-- ASN1STOP
``` aspect, the first configuration for prioritized 2-step RA signaling includes a scaling factor for a backoff indicator. According to one or more embodiments of this aspect, the scaling factor associated with the first configuration corresponds to a scaling factor configured for 4-step RA signaling. According to one or more embodiments of this aspect, the scaling factor associated with the first configuration is configured to be implemented for at least one of: contention based random access if contention free random access is not supported by the prioritized 2-step RA signaling, contention free based random access in the prioritized 2-step RA signaling, and contention based random access and contention free random access in the prioritized 2-step RA signaling.

According to one or more embodiments of this aspect, the first configuration is applied to a message, the message including one of: a random access preamble portion, and the random access preamble portion and a physical uplink shared channel, PUSCH, portion. According to one or more embodiments of this aspect, the transmission of the first configuration corresponds to broadcasting the first configuration in system information block (SIB). According to one or more embodiments of this aspect, the SIB includes the second configuration. According to one or more embodiments of this aspect, the power ramping step of the first configuration one of: corresponds to a power step size for 4-step RA signaling that is associated with the second configuration, and is greater than the power step size for 4-step RA signaling that is associated with the second configuration.

According to one or more embodiments of this aspect, the power ramping step of the first configuration reuses the power step size configured for 4-step RA signaling that is associated with the second configuration. According to one or more embodiments of this aspect, the first configuration is configured for contention free based random access, where the second configuration is configured for contention based random access. According to one or more embodiments of this aspect, the scaling factor of the first configuration corresponds to a shorter time window from which to select a backoff time than a time window for selecting a backoff time in the second configuration for the RA signaling.

Accordingly to another aspect of the disclosure, a wireless device configured to communicate with a network node is provided. The wireless device comprising: processing circuitry configured to receive a first configuration for prioritized 2-step random access, RA, signaling where the first configuration includes at least a power ramping step and is separately configured from a second configuration for RA signaling, and perform prioritized 2-step RA signaling based on the power ramping step of the first configuration.

According to one or more embodiments of this aspect, the power ramping step of the first configuration has a larger power step size than a power step size of the second configuration. According to one or more embodiments of this aspect, the RA signaling associated with the second configuration is one of 4-step RA signaling and 2-step RA signaling. According to one or more embodiments of this aspect, the first configuration for prioritized 2-step RA signaling includes a scaling factor for a backoff indicator.

According to one or more embodiments of this aspect, the scaling factor associated with the first configuration corresponds to a scaling factor configured for 4-step RA signaling. According to one or more embodiments of this aspect, the scaling factor associated with the first configuration is configured to be implemented for at least one of: contention based random access if contention free random access is not supported by the prioritized 2-step RA signaling, contention free based random access in the prioritized 2-step RA signaling, and contention based random access and contention free random access in the prioritized 2-step RA signaling. According to one or more embodiments of this aspect, the processing circuitry is further configured to apply the first configuration to a message, the message including one of: a random access preamble portion and the random access preamble portion and a physical uplink shared channel, PUSCH, portion.

According to one or more embodiments of this aspect, the first configuration is received in a broadcast of system information block (SIB). According to one or more embodiments of this aspect, the SIB includes the second configuration. According to one or more embodiments of this aspect, the power ramping step of the first configuration one of: corresponds to a power step size for 4-step RA signaling that is associated with the second configuration, and is greater than the power step size for 4-step RA signaling that is associated with the second configuration. According to one or more embodiments of this aspect, the power ramping step of the first configuration reuses the power step size configured for 4-step RA signaling that is associated with the second configuration.

According to one or more embodiments of this aspect, the first configuration is configured for contention free based random access, and the second configuration is configured for contention based random access. According to one or more embodiments of this aspect, the scaling factor of the first configuration corresponds to a shorter time window from which to select a backoff time than a time window for selecting a backoff time in the second configuration for the RA signaling.

According to another aspect of the disclosure, a method implemented by a network node that is configured to communicate with a wireless device is provided. A first configuration for prioritized 2-step random access, RA, signaling is transmitted where the first configuration includes at least a power ramping step and is separately configured from a second configuration for RA signaling. The prioritized 2-step RA signaling is performed based on the power ramping step of the first configuration.

According to one or more embodiments of this aspect, the power ramping step of the first configuration has a larger power step size than a power step size of the second configuration. According to one or more embodiments of this aspect, the RA signaling associated with the second configuration is one of 4-step RA signaling and 2-step RA signaling. According to one or more embodiments of this aspect, the first configuration for prioritized 2-step RA signaling includes a scaling factor for a backoff indicator. According to one or more embodiments of this aspect, the scaling factor associated with the first configuration corresponds to a scaling factor configured for 4-step RA signaling.

According to one or more embodiments of this aspect, the scaling factor associated with the first configuration is configured to be implemented for at least one of: contention based random access if contention free random access is not supported by the prioritized 2-step RA signaling, contention free based random access in the prioritized 2-step RA signaling, and contention based random access and contention free random access in the prioritized 2-step RA signaling. According to one or more embodiments of this aspect, the first configuration is applied to a message, the message including one of: a random access preamble portion, and the random access preamble portion and a physical uplink shared channel, PUSCH, portion. According to one or more embodiments of this aspect, the transmission of the first configuration corresponds to broadcasting the first configuration in system information block (SIB).

According to one or more embodiments of this aspect, the SIB includes the second configuration. According to one or more embodiments of this aspect, the power ramping step of the first configuration one of: corresponds to a power step size for 4-step RA signaling that is associated with the second configuration, and is greater than the power step size for 4-step RA signaling that is associated with the second configuration. According to one or more embodiments of this aspect, the power ramping step of the first configuration reuses the power step size configured for 4-step RA signaling that is associated with the second configuration.

According to one or more embodiments of this aspect, the first configuration is configured for contention free based random access, and the second configuration is configured for contention based random access. According to one or more embodiments of this aspect, the scaling factor of the first configuration corresponds to a shorter time window from which to select a backoff time than a time window for selecting a backoff time in the second configuration for the RA signaling.

According to another aspect of the disclosure, a method implemented by a wireless device that is configured to communicate with a network node is provided. A first configuration for prioritized 2-step random access, RA, signaling is received where the first configuration includes at least a power ramping step and is separately configured from a second configuration for RA signaling, and prioritized 2-step RA signaling is performed based on the power ramping step of the first configuration.

According to one or more embodiments of this aspect, the power ramping step of the first configuration has a larger power step size than a power step size of the second configuration. According to one or more embodiments of this aspect, the RA signaling associated with the second configuration is one of 4-step RA signaling and 2-step RA signaling. According to one or more embodiments of this aspect, the first configuration for prioritized 2-step RA signaling includes a scaling factor for a backoff indicator.

According to one or more embodiments of this aspect, the scaling factor associated with the first configuration corresponds to a scaling factor configured for 4-step RA signaling. According to one or more embodiments of this aspect, the scaling factor associated with the first configuration is configured to be implemented for at least one of: contention based random access if contention free random access is not supported by the prioritized 2-step RA signaling, contention free based random access in the prioritized 2-step RA signaling, and contention based random access and contention free random access in the prioritized 2-step RA signaling. According to one or more embodiments of this aspect, the first configuration is applied to a message where the message includes one of: a random access preamble portion, and the random access preamble portion and a physical uplink shared channel, PUSCH, portion.

According to one or more embodiments of this aspect, the first configuration is received in a broadcast of system information block (SIB). According to one or more embodiments of this aspect, the SIB includes the second configuration. According to one or more embodiments of this aspect, the power ramping step of the first configuration one of: corresponds to a power step size for 4-step RA signaling that is associated with the second configuration, and is greater than the power step size for 4-step RA signaling that is associated with the second configuration.

According to one or more embodiments of this aspect, the power ramping step of the first configuration reuses the power step size configured for 4-step RA signaling that is associated with the second configuration. According to one or more embodiments of this aspect, the first configuration is configured for contention free based random access, and the second configuration is configured for contention based random access. According to one or more embodiments of this aspect, the scaling factor of the first configuration corresponds to a shorter time window from which to select a backoff time than a time window for selecting a backoff time in the second configuration for the RA signaling.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 5 is a flowchart illustrating exemplary methods implemented in a communication system including a host computer, a network node and a wireless device for executing a client application at a wireless device according to some embodiments of the present disclosure;

FIG. 6 is a flowchart illustrating exemplary methods implemented in a communication system including a host computer, a network node and a wireless device for receiving user data at a wireless device according to some embodiments of the present disclosure;

DETAILED DESCRIPTION

Figure 1:
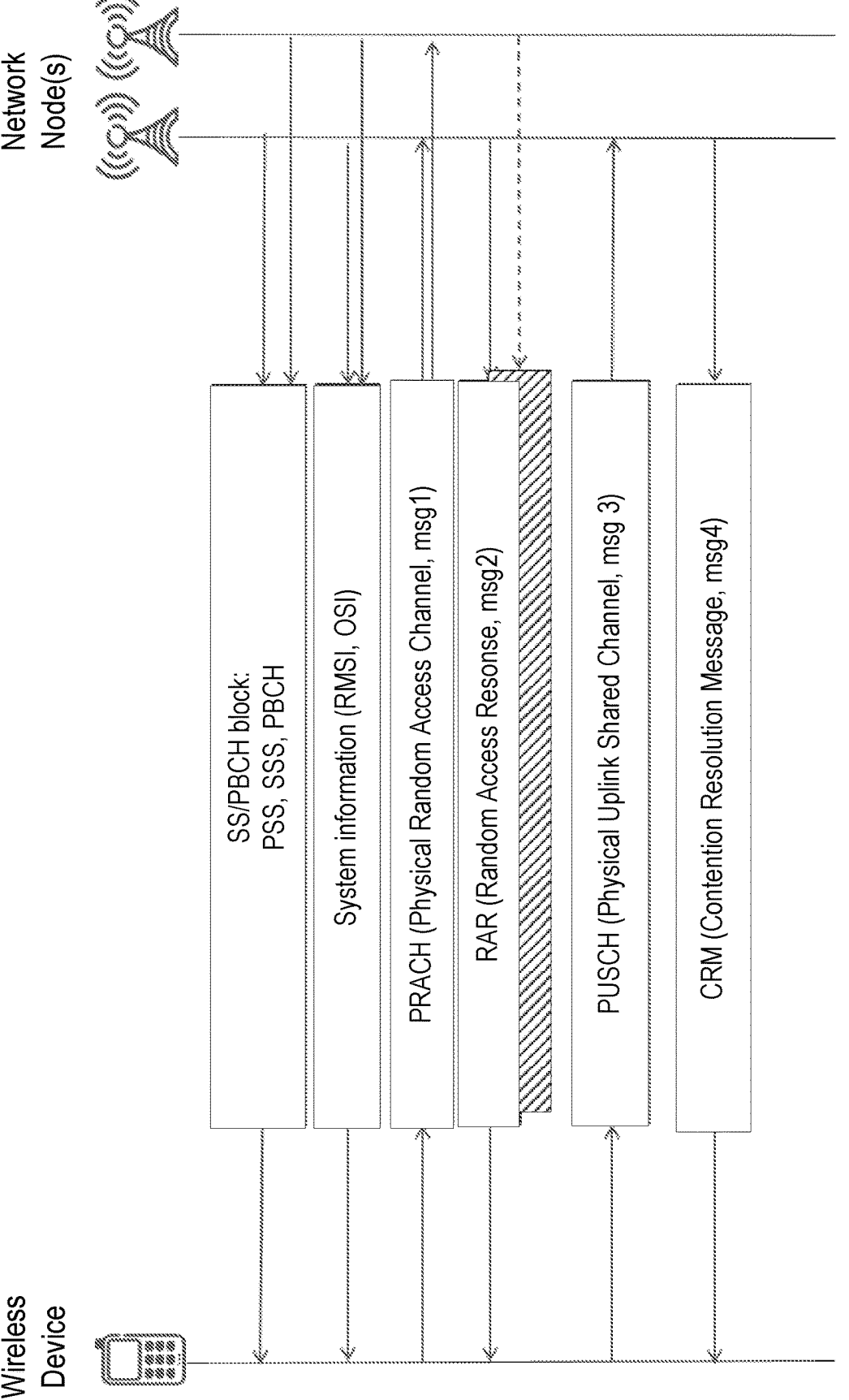
FIG. 1 is a signaling diagram of a 4-step random access procedure.
Figure 2:
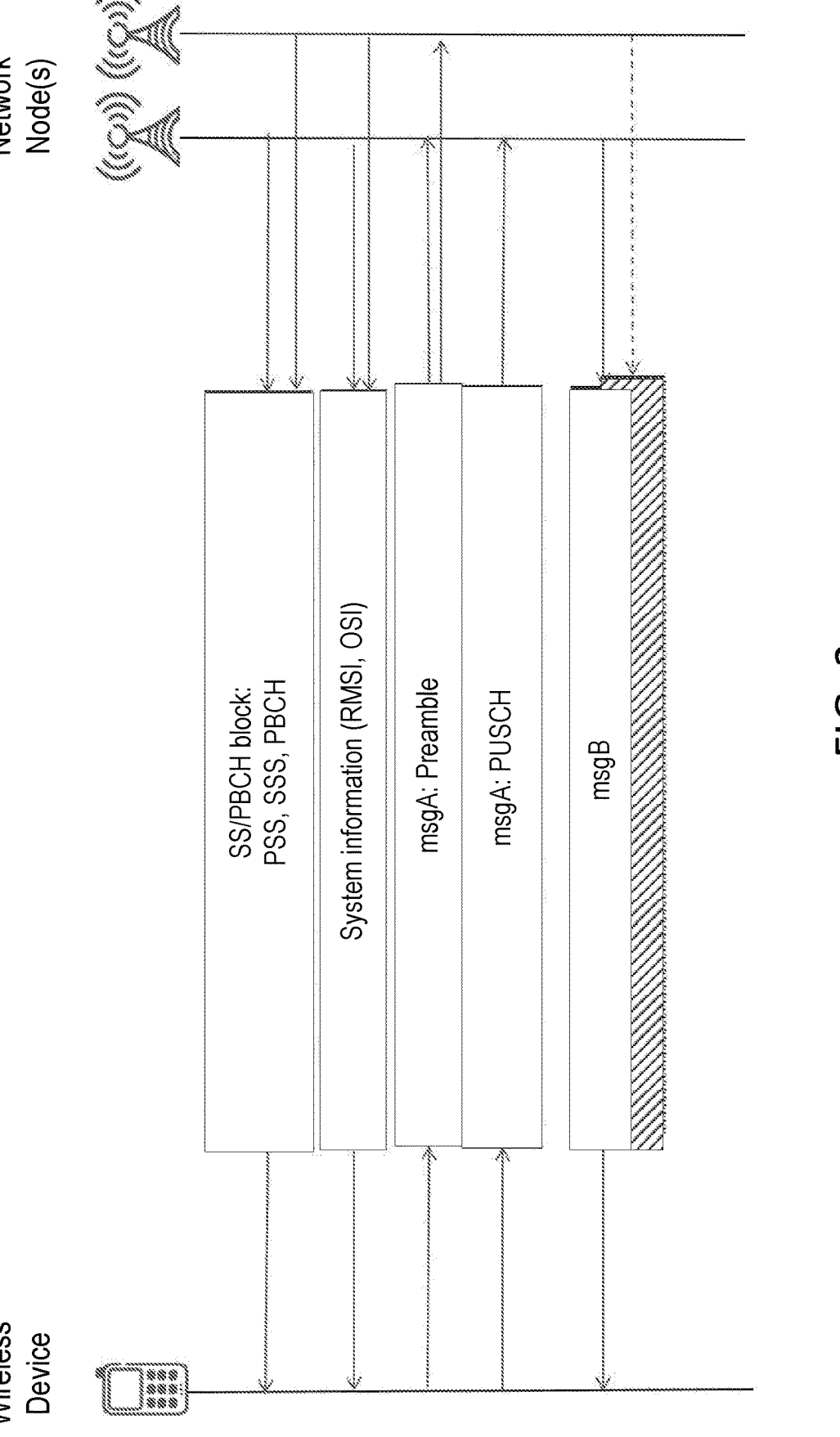
FIG. 2 is a signaling diagram of a two-step initial access procedure.

Before describing in detail exemplary embodiments, it is noted that the embodiments reside primarily in combinations of apparatus components and processing steps related to prioritized 2-step random access channel (RACH) signaling. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Configuring a terminal or wireless device or node may involve instructing and/or causing the wireless device or node to change its configuration, e.g., at least one setting and/or register entry and/or operational mode. A terminal or wireless device or node may be adapted to configure itself, e.g., according to information or data in a memory of the terminal or wireless device. Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 3:
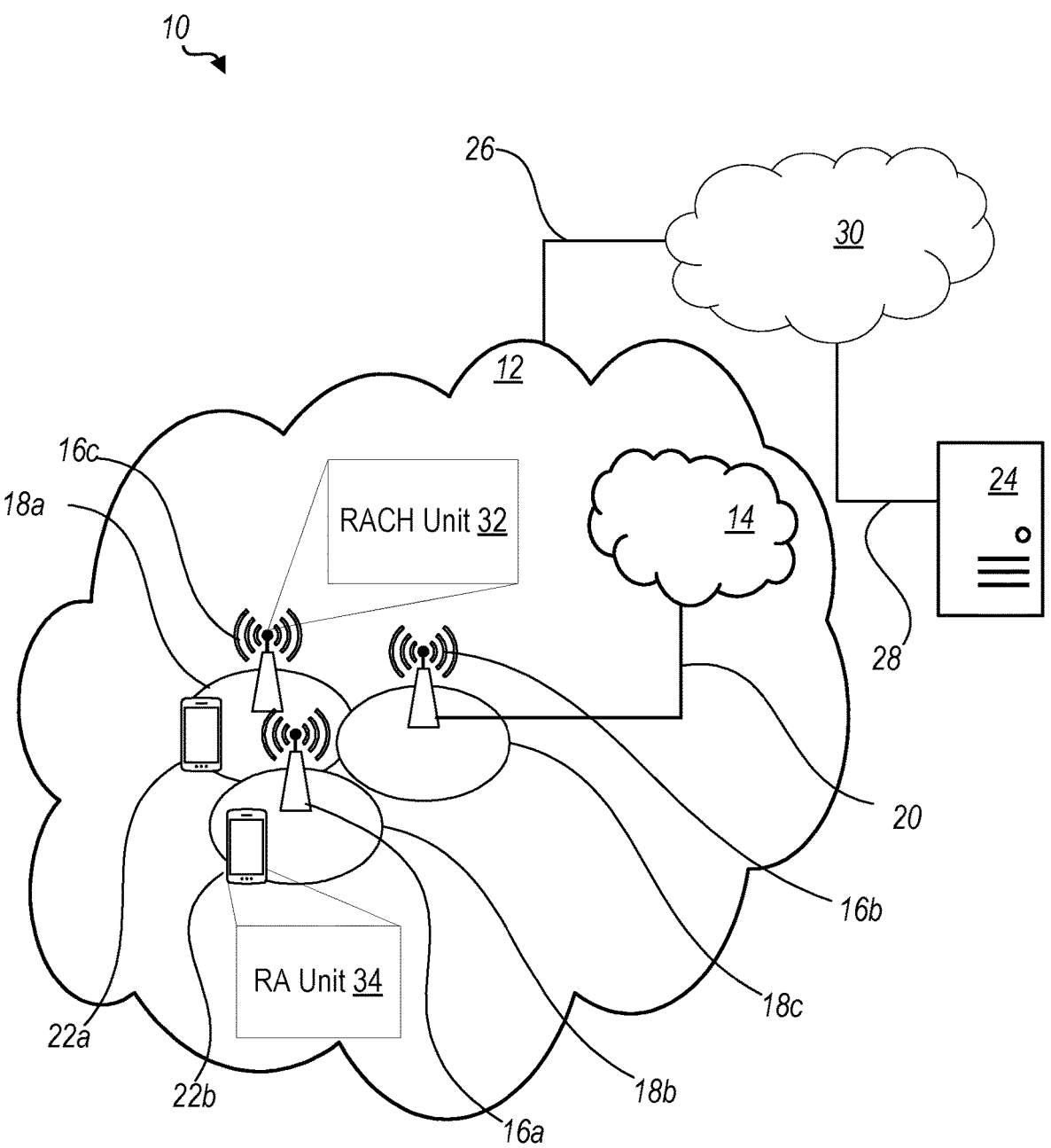
FIG. 3 is a schematic diagram of an exemplary network architecture illustrating a communication system connected via an intermediate network to a host computer according to the principles in the present disclosure.

Embodiments disclosed herein provide prioritized 2-step random access channel (RACH) signaling. Referring again to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a random access channel (RACH) unit 32 which is configured to perform one or more network node 16 functions as described herein such as with respect to prioritized 2-step random access channel (RACH) signaling. As used herein, RACH signaling corresponds to RA signaling. A wireless device 22 is configured to include a random access (RA) unit 34 which is configured to perform one or more wireless device 22 functions described herein such as with respect to prioritized 2-step random access channel (RACH) signaling.

Example implementations, in accordance with an embodiment, of the WD 22, network node 16 and host computer 24 discussed in the preceding paragraphs will now be described with reference to FIG. 4. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to process, receive, transmit, forward, relay, store, etc. information related and/or associated with prioritized 2-step random access channel (RACH) signaling.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include RACH unit 32 configured to perform one or more network node 16 functions described herein such as with respect to prioritized 2-step random access channel (RACH) signaling.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a RA unit 34 configured to perform one or more wireless device 22 functions as described herein such as with respect to prioritized 2-step random access channel (RACH) signaling.

Figure 4:
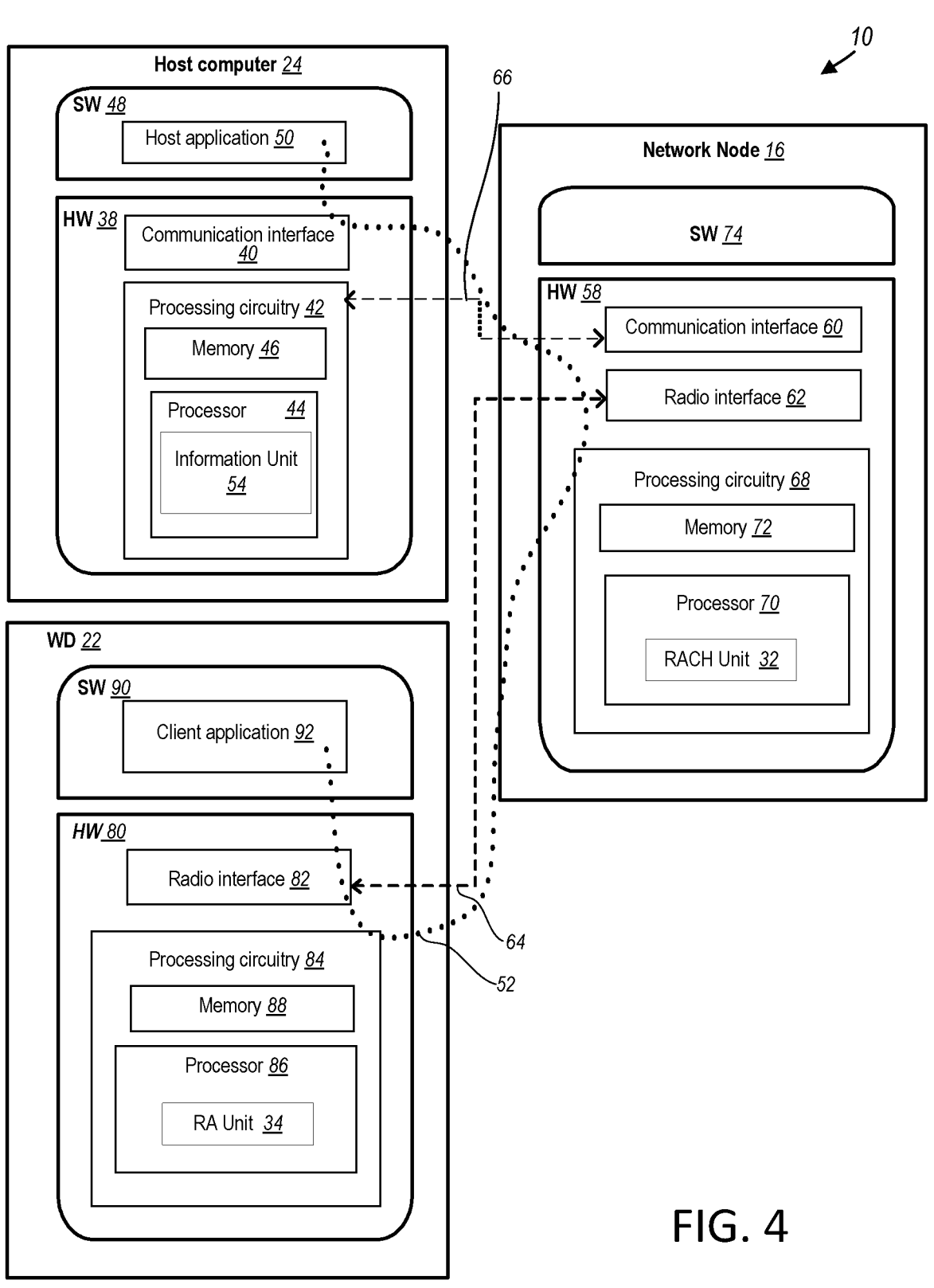
FIG. 4 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 4 and independently, the surrounding network topology may be that of FIG. 3.

In FIG. 4, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 3 and 4 show various "units" such as RACH unit 32, and RA unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry. It is noted that implementations of the disclosure can be made without using OTT functionality. In other words, implementations of the embodiments described herein do not require the inclusion of the host computer 24 and connection 28.

FIG. 5 is a flowchart illustrating an exemplary method implemented in a communication system, such as, for example, the communication system of FIGS. 3 and 4, in accordance with one embodiment. The communication system may include a host computer 24, a network node 16 and a WD 22, which may be those described with reference to FIG. 4. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 6 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 7, 8:
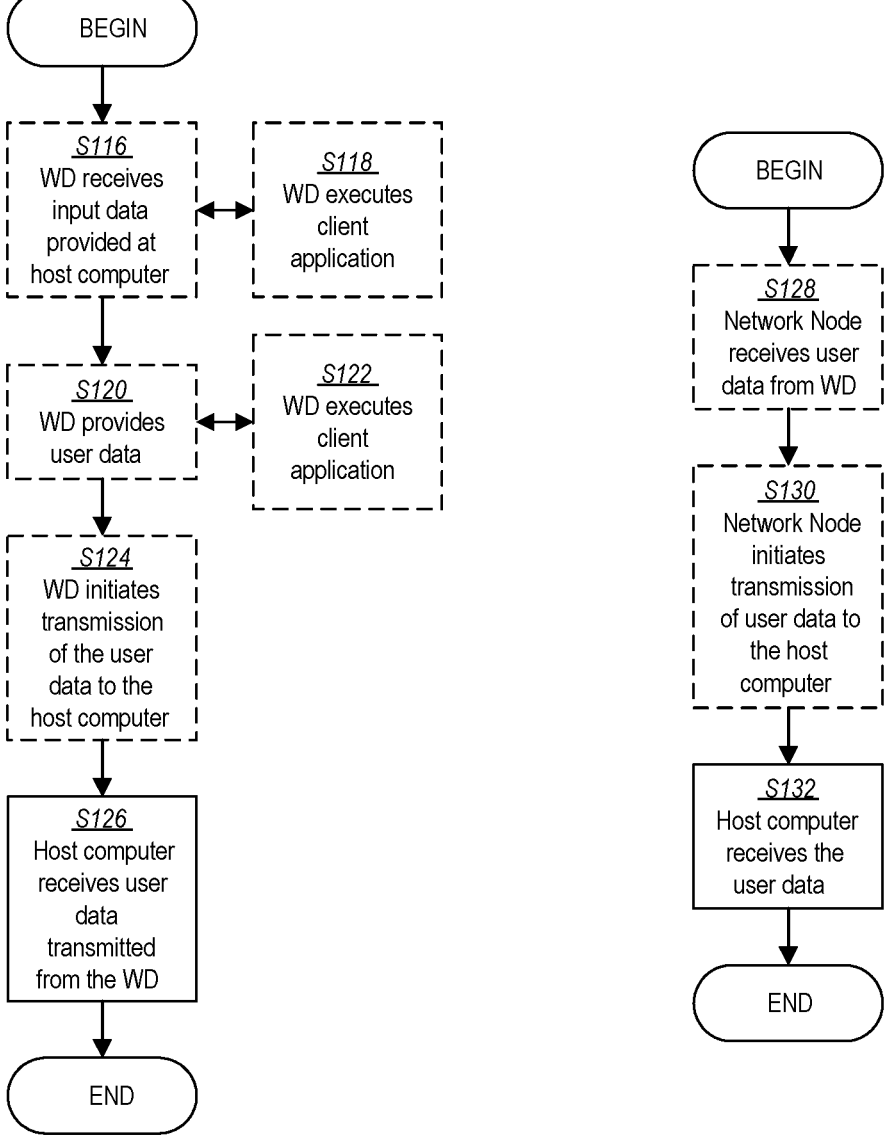
FIG. 7 is a flowchart illustrating exemplary methods implemented in a communication system including a host computer, a network node and a wireless device for receiving user data from the wireless device at a host computer according to some embodiments of the present disclosure.
FIG. 8 is a flowchart illustrating exemplary methods implemented in a communication system including a host computer, a network node and a wireless device for receiving user data at a host computer according to some embodiments of the present disclosure.

FIG. 7 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 8 is a flowchart illustrating an exemplary method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 9:
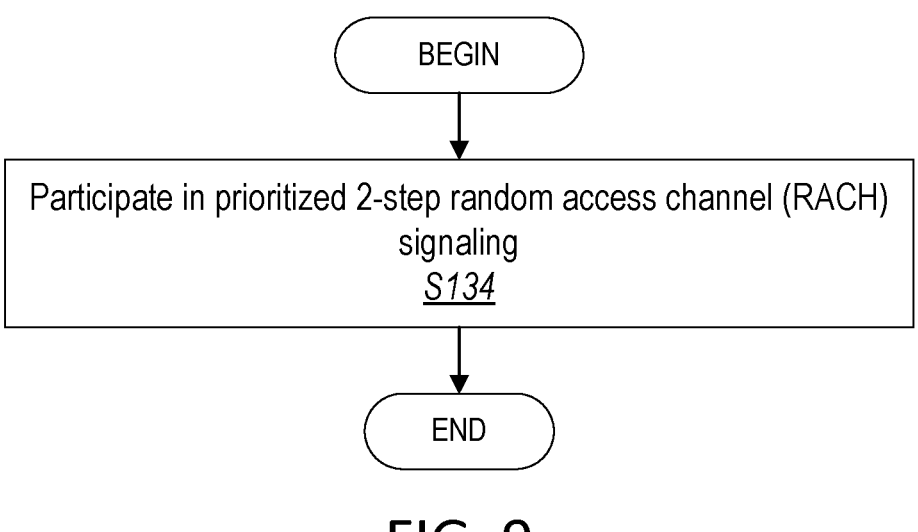
FIG. 9 is a flowchart of an exemplary process in a network node according to some embodiments of the present disclosure.

FIG. 9 is a flowchart of an exemplary process in a network node 16 according to some embodiments of the present disclosure. One or more Blocks and/or functions performed by network node 16 may be performed by one or more elements of network node 16 such as by RACH unit 32 in processing circuitry 68, processor 70, radio interface 62, etc.

In one or more embodiments, network node 16 such as via one or more of processing circuitry 68, processor 70, RACH unit 32 communication interface 60 and radio interface 62 is configured to participate (S134) in prioritized 2-step random access channel (RACH) signaling, as described herein.

According to one or more embodiments, the prioritized 2-step RACH signaling includes message A and message B where message A includes a random access preamble part and an uplink shared channel part. According to one or more embodiments, the prioritized 2-step RACH signaling corresponds to a power ramping configuration separate from 4-step RACH signaling where the prioritized 2-step RACH signaling uses a larger power step size than the 4-step RACH signaling. According to one or more embodiments, the prioritized 2-step RACH signaling uses a different power step size than non-prioritized 2-step RACH signaling and 4-step RACH signaling. According to one or more embodiments, the prioritized 2-step RACH signaling is associated with a power backoff time that is scaled based at least in part on a backoff timing used in 4-step contention free radio access.

Figure 10:
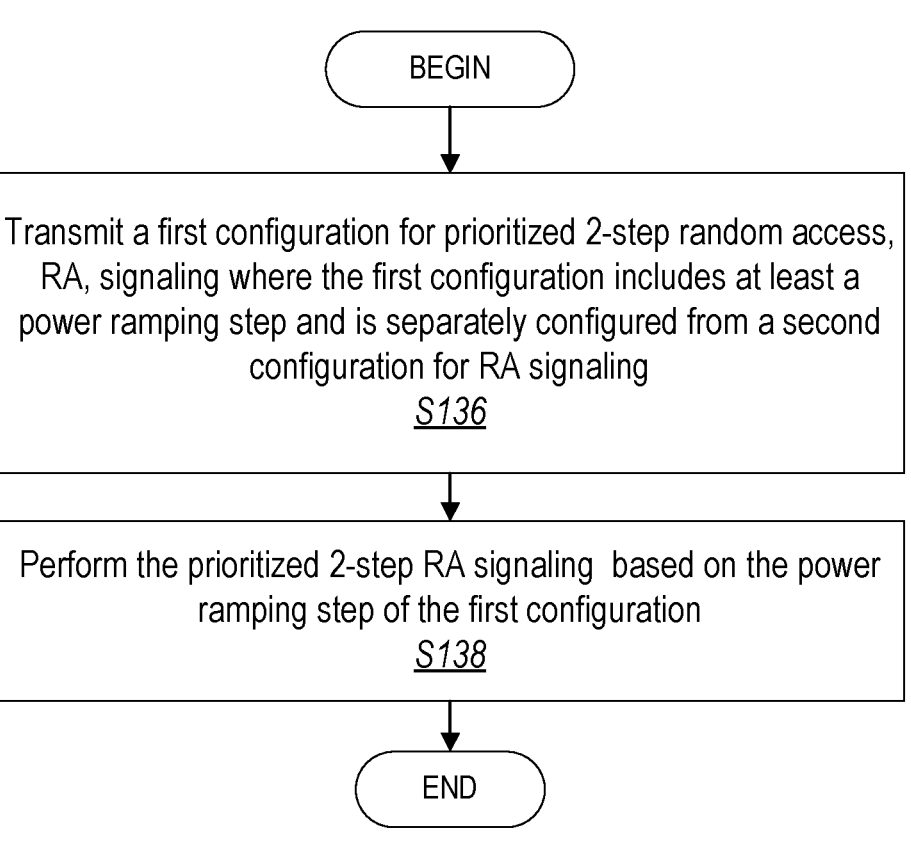
FIG. 10 is a flowchart of another exemplary process in a network node according to some embodiments of the present disclosure.

FIG. 10 is a flowchart of another exemplary process in a network node 16 according to some embodiments of the present disclosure. One or more Blocks and/or functions performed by network node 16 may be performed by one or more elements of network node 16 such as by RACH unit 32 in processing circuitry 68, processor 70, radio interface 62, etc. In one or more embodiments, network node 16 such as via one or more of processing circuitry 68, processor 70, RACH unit 32 communication interface 60 and radio interface 62 is configured to transmit (Block S136) a first configuration for prioritized 2-step random access, RA, signaling where the first configuration includes at least a power ramping step and is separately configured from a second configuration for RA signaling, as described herein. In one or more embodiments, network node 16 such as via one or more of processing circuitry 68, processor 70, RACH unit 32 communication interface 60 and radio interface 62 is configured to perform (Block S138) the prioritized 2-step RA signaling based on the power ramping step of the first configuration, as described herein.

According to one or more embodiments, the power ramping step of the first configuration has a larger power step size than a power step size of the second configuration. According to one or more embodiments, the RA signaling associated with the second configuration is one of 4-step RA signaling and 2-step RA signaling. According to one or more embodiments, the first configuration for prioritized 2-step RA signaling includes a scaling factor for a backoff indicator.

According to one or more embodiments, the scaling factor associated with the first configuration corresponds to a scaling factor configured for 4-step RA signaling. According to one or more embodiments, the scaling factor associated with the first configuration is configured to be implemented for at least one of: contention based random access if contention free random access is not supported by the prioritized 2-step RA signaling, contention free based random access in the prioritized 2-step RA signaling, and contention based random access and contention free random access in the prioritized 2-step RA signaling. According to one or more embodiments, the first configuration is applied to a message, the message including one of: a random access preamble portion, and the random access preamble portion and a physical uplink shared channel, PUSCH, portion.

According to one or more embodiments, the transmission of the first configuration corresponds to broadcasting the first configuration in system information block (SIB). According to one or more embodiments, the SIB includes the second configuration. According to one or more embodiments, the power ramping step of the first configuration one of: corresponds to a power step size for 4-step RA signaling that is associated with the second configuration, and is greater than the power step size for 4-step RA signaling that is associated with the second configuration.

According to one or more embodiments, the power ramping step of the first configuration reuses the power step size configured for 4-step RA signaling that is associated with the second configuration. According to one or more embodiments, the first configuration is configured for contention free based random access and the second configuration is configured for contention based random access. According to one or more embodiments, the scaling factor of the first configuration corresponds to a shorter time window from which to select a backoff time than a time window for selecting a backoff time in the second configuration for the RA signaling.

Figure 11:
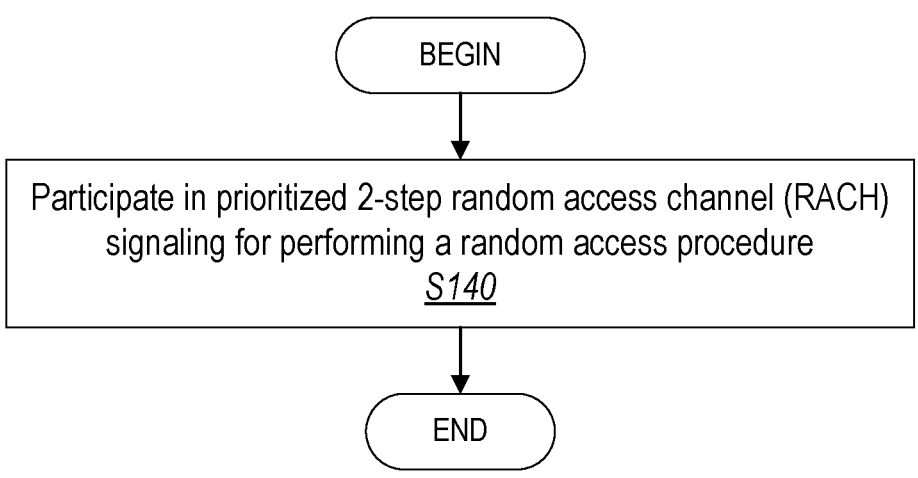
FIG. 11 is a flowchart of an exemplary process in a wireless device according to some embodiments of the present disclosure.

FIG. 11 is a flowchart of an exemplary process in a wireless device 22 according to some embodiments of the present disclosure. One or more Blocks and/or functions performed by wireless device 22 may be performed by one or more elements of wireless device 22 such as by RA unit 34 in processing circuitry 84, processor 86, radio interface 82, etc. In one or more embodiments, wireless device such as via one or more of processing circuitry 84, RA unit 34 processor 86 and radio interface 82 is configured to participate (Block S140) in prioritized 2-step random access channel (RACH) signaling for performing a random access procedure, as described herein.

According to one or more embodiments, the prioritized 2-step RACH signaling includes message A and message B where message A includes a random access preamble part and an uplink shared channel part. According to one or more embodiments, the prioritized 2-step RACH signaling corresponds to a power ramping configuration separate from 4-step RACH signaling where the prioritized 2-step RACH signaling uses a larger power step size than the 4-step RACH signaling. According to one or more embodiments, the prioritized 2-step RACH signaling uses a different power step size than non-prioritized 2-step RACH signaling and 4-step RACH signaling. According to one or more embodiments, the prioritized 2-step RACH signaling is associated with a power backoff time that is scaled based at least in part on a backoff timing used in 4-step contention free radio access.

Figure 12:
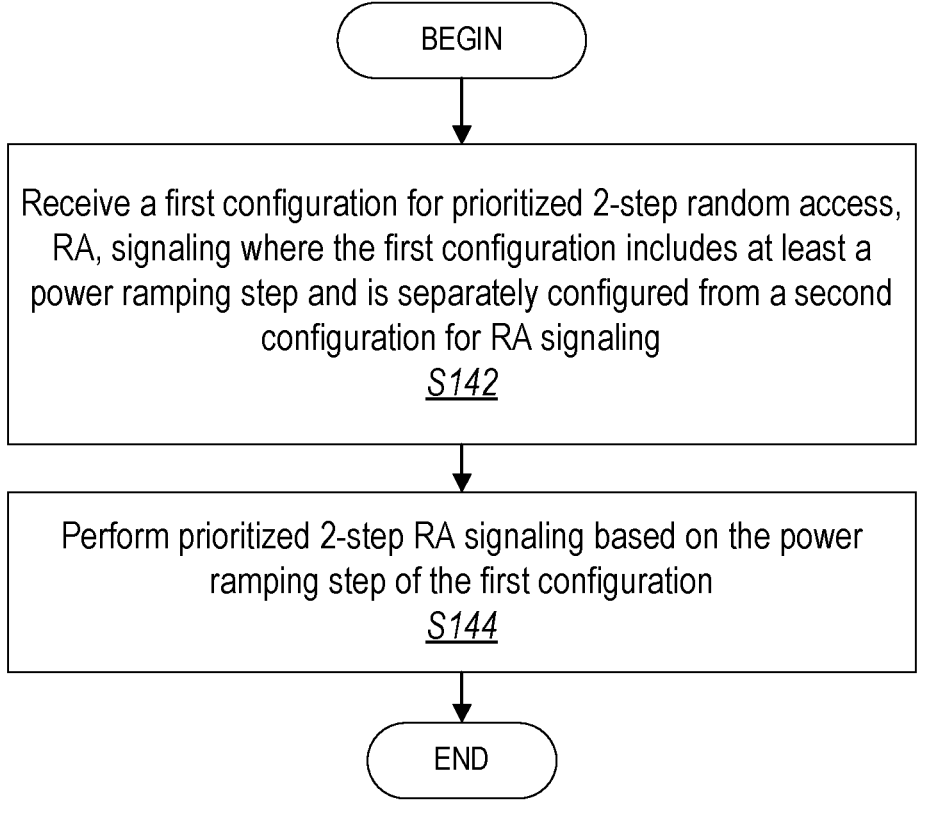
FIG. 12 is a flowchart of another exemplary process in a wireless device according to some embodiments of the present disclosure.

FIG. 12 is a flowchart of another exemplary process in a wireless device 22 according to some embodiments of the present disclosure. One or more Blocks and/or functions performed by wireless device 22 may be performed by one or more elements of wireless device 22 such as by RA unit 34 in processing circuitry 84, processor 86, radio interface 82, etc. In one or more embodiments, wireless device such as via one or more of processing circuitry 84, RA unit 34 processor 86 and radio interface 82 is configured to receive (Block S142) a first configuration for prioritized 2-step random access, RA, signaling where the first configuration includes at least a power ramping step and is separately configured from a second configuration for RA signaling, as described herein. In one or more embodiments, wireless device 22 such as via one or more of processing circuitry 84, RA unit 34 processor 86 and radio interface 82 is configured to perform (Block S144) prioritized 2-step RA signaling based on the power ramping step of the first configuration, as described herein.

According to one or more embodiments, the power ramping step of the first configuration has a larger power step size than a power step size of the second configuration. According to one or more embodiments, the RA signaling associated with the second configuration is one of 4-step RA signaling and 2-step RA signaling. According to one or more embodiments, the first configuration for prioritized 2-step RA signaling includes a scaling factor for a backoff indicator. According to one or more embodiments, the scaling factor associated with the first configuration corresponds to a scaling factor configured for 4-step RA signaling.

According to one or more embodiments, the scaling factor associated with the first configuration is configured to be implemented for at least one of: contention based random access if contention free random access is not supported by the prioritized 2-step RA signaling, contention free based random access in the prioritized 2-step RA signaling, and contention based random access and contention free random access in the prioritized 2-step RA signaling. According to one or more embodiments, the processing circuitry 84 is further configured to apply the first configuration to a message, the message including one of: a random access preamble portion and the random access preamble portion and a physical uplink shared channel, PUSCH, portion. According to one or more embodiments, the first configuration is received in a broadcast of system information block (SIB).

According to one or more embodiments, the SIB includes the second configuration. According to one or more embodiments, the power ramping step of the first configuration one of: corresponds to a power step size for 4-step RA signaling that is associated with the second configuration, and is greater than the power step size for 4-step RA signaling that is associated with the second configuration. According to one or more embodiments, the power ramping step of the first configuration reuses the power step size configured for 4-step RA signaling that is associated with the second configuration. According to one or more embodiments, the first configuration is configured for contention free based random access, and the second configuration is configured for contention based random access. According to one or more embodiments, the scaling factor of the first configuration corresponds to a shorter time window from which to select a backoff time than a time window for selecting a backoff time in the second configuration for the RA signaling.

Having generally described arrangements for prioritized 2-step random access channel (RACH) signaling, details for these arrangements, functions and processes are provided as follows, and which may be implemented by the network node 16, wireless device 22 and/or host computer 24. In particular, as described herein, 2-step RA configurations are provided/configured separate from 4-step RA such that power/BI configuration can be prioritized for 2-step RACH/RA. In one or more embodiments, prioritized 2-step RA incudes one or more of dedicated high power, low latency, etc., at least when compared to at least one of prioritized 4-step RA, existing/non-prioritized 4-step RA and non-prioritized 2-step RA with common power ramping step and common backoff indication. In one or more embodiments, non-prioritized 2-step RACH/RA signaling corresponds to normal/common 2-step RACH/RA signaling that is not configured with the prioritization parameters described herein.

In one or more embodiments, RA is used interchangeably with RACH such that a 4-step RA and 4-step RA signaling may correspond to a 4-step RACH and 4-step RACH signaling, for example, and vice versa. In one or more embodiments, 2-step RA signaling includes msgA:preamble and/or msgA: PUSCH, and msgB where the teaching described herein apply to some or all of the prioritized 2-step RA signaling. In one or more embodiments, 4-step RA signaling includes msg1-msg4.

One or more methods described herein advantageously provide prioritized RACH for 2-step RACH msgA, where the msgA is composed of the random access preamble (i.e., PRACH) part and the PUSCH part.

Power Ramping of msgA in 2-Step RA in the RACH

Separate Power Ramping for msgA in 2-Step RA and Msg1 in 4-Step RA

In one embodiment, a separate configuration of the power ramping step size for 2-step RA is applied by the network node 16 and/or wireless device 22, which may allow larger power ramping step size. Since 2-step RACH may be used by wireless device 22 such as via RA unit 34 that desires faster random access (RA) success (e.g., successful random access procedure), the power ramping for 2-step RA may be separately configured than for 4-step RACH such as by network node 16. The separate configuration may allow the 2-step RA to use larger power ramping step size than that of 4-step RACH. As used herein, power ramping step size, power step size and step size may be used interchangeably.

Since the target received power of the preamble scales linearly with the power ramping size step (as described in wireless device protocols such as in 3GPP TS 38.321, for example), larger power ramping step size is allowed to be implemented with a higher transmitted power level for 2-step RACH, for both the preamble part and the PUSCH part:

1> set PREAMBLE_RECEIVED_TARGET_POWER to preambleReceivedTargetPower+DELTA_PRE-AMBLE+(PREAMBLE_POWER_RAMPING_COUNTER−1)×PREAMBLE_POWER_RAMPING_STEP;

One example of defining the RRC configuration of two-step RACH in Common IE RACH-ConfigGeneric is shown below when a "high-prio", i.e., high priority, 2-step is targeted for wireless devices 22 in all RRC states.

RACH-ConfigGeneric information element where the bold portions may indicate changes to existing standards.

```
-- ASN1START
-- TAG-RACH-CONFIGGENERIC-START
RACH-ConfigGeneric ::=                    SEQUENCE {
    prach-ConfigurationIndex                  INTEGER (0..255),
    msg1-FDM                                  ENUMERATED {one, two, four, eight},
    msg1-FrequencyStart                       INTEGER (0..maxNrofPhysicalResourceBlocks-1),
    zeroCorrelationZoneConfig                 INTEGER(0..15),
    preambleReceivedTargetPower               INTEGER (−202..−60),
    preambleTransMax                          ENUMERATED {n3, n4, n5, n6, n7, n8, n10, n20,
n50, n100, n200},
    powerRampingStep                          ENUMERATED {dB0, dB2, dB4, dB6},
    ra-ResponseWindow                         ENUMERATED {s11, s12, s14, s18, s110, s120, s140,
s180},
    powerRampingStepHighPriority                  ENUMERATED {dB0, dB2, dB4, dB6},
    scalingFactorBI                           ENUMERATED {zero, dot25, dot5, dot75}
OPTIONAL, -- Need R
    ...
}
-- TAG-RACH-CONFIGGENERIC-STOP
-- ASN1STOP
```

45

In other words, normal/existing/common RA signaling may include "powerRampingStep" and "ra-ResponseWindow" indicated above while prioritized 2-step RA signaling includes "powerRamplingStepHighPriority" and/or "scalingFactorBI."

Another example of defining the RRC configuration of two-step RACH in dedicated IE RACH-ConfigDedicated is shown below when a "high-prix" 2-step for contention based random access (CBRA) for handover (HO). CBRA may generally refer to where resources used for msg1 or msgA transmission are randomly selected, by the wireless device 22, from a set of resources. Contention free random access (CFRA) may generally refer to where resources for msg1 or msgA transmission are assigned in dedicated signaling, by the network node 16, before the wireless device 22 starts transmitting msg1 or msgA.

RACH-ConfigDedicated information element where the bold portions may indicate changes to existing standards.

```
-- ASN1START
-- TAG-RACH-CONFIGDEDICATED-START
RACH-ConfigDedicated ::=            SEQUENCE {
cfra                               CFRA OPTIONAL,
-- Need S
ra-Prioritization        RA-Prioritization
OPTIONAL, -- Need N
rach-Config2Step                            RACH-Config2Step
OPTIONAL, -- Need N
    ...
}
RACH-Config2Step ::=               SEQUENCE {
  prach-ConfigurationIndex             INTEGER (0..255),
  msg1-FDM                       ENUMERATED {one, two, four, eight},
  msg1-FrequencyStart              INTEGER (0..maxNrofPhysicalResourceBlocks-1),
  zeroCorrelationZoneConfig             INTEGER(0..15),
  preambleReceivedTargetPower             INTEGER (-202..-60),
  preambleTransMax                 ENUMERATED {n3, n4, n5, n6, n7, n8, n10, n20,
n50, n100, n200},
powerRampingStepHighPriority               ENUMERATED {dB0, dB2, dB4, dB6},
scalingFactorBI                ENUMERATED {zero, dot25, dot5, dot75}
OPTIONAL, -- Need R
  ra-ResponseWindow                    ENUMERATED {s11, s12, s14, s18, s110, s120,
s140, s180},
    ...
}
```

In another embodiment, only the high priority power ramping step size may be separately configured for 2-step RA. In one or more embodiments, the priority power ramping step size is applied to the msgA preamble part or applied to both the msgA preamble part and msgA PUSCH part. For example, in some embodiments, there is used a msgA with only a preamble part that is sometimes a preamble selected by the wireless device 22 that may not be able to be mapped to on the PUSCH part due to the PUSCH resource not being valid. In one or more embodiments, the one or more RACH configurations may be signalled by network node 16 such as via radio interface 62 to wireless device 22. In one or more embodiments, one or more RACH configurations are stored in memory 88 of the wireless device 22.

2-Step RACH can be Configured with a Larger Power Ramping Step Size than that of 4-Step RACH.

powerRampingStepHighPriority2Step ENUMERATED {dB0, dB2, dB4, dB6},

Reuse the Step Size Defined for 4-Step RA

In one or more embodiments, to avoid introducing additional signaling overhead, the normal (i.e., not prioritized) power ramping step size and the prioritized power ramping step size used for 4-step RA may also be used by 2-step RA by network node 16 and/or wireless device 22.

In one or more embodiments, only the high priority step size may always be used by 2-step RA by wireless device 22 and/or network node 16, where the 2-step RA can be either contention based RA or contention free RA if supported (CFRA may or may not be supported by 2-step RA).

In one or more embodiments, the wireless device 22 and/or network node 16 use the normal (not prioritized) power ramping step size by the contention based 2-step random access, while the high priority step size is used by the contention based random access.

In one or more embodiments, the wireless device 22 and/or network node 16 may use only the normal power ramping step size by the contention based 2-step RA, and the contention free random access may not be supported by 2-step RA.

In one or more embodiments, only the high priority power ramping step size may be used in a wireless device 22 such as via processing circuitry 84 for performing 2-step RA, when the logical channel priority of the data for this logical channel (LCH) or logical channel belonging to this logical channel group (LCG) to be transmitted is high, e.g. URLLC.

In one or more embodiments, only the high priority power ramping step size is used in a wireless device 22 such as via processing circuitry 84 for performing 2-step RA, when the logical channel priority of the data for a logical channel (LCH) or logical channel belonging to this logical channel group (LCG) to be transmitted is according to a configured setting.

The step size in one or more embodiments above can be the step size for msgA preamble part and/or the step size for the msgA PUSCH part.

Prioritized Backoff Time for 2-Step RA

2-Step Contention Based RA May Use a Scaled Version of the Timing Used for 4-Step Contention Free RA In one or more embodiments, the 2-step RACH can be configured by network node 16 via processing circuitry 68 and/or RACH unit 32 with a scaling factor of a backoff indicator such that the window for selecting the random backoff time is shorter.

In some embodiments, the scaling factor can correspond to and/or be based at least in part on one or more of:
   the scaling factor configured for 4-step RA
   the scaling factor separately configured
In some embodiments, the scaling factor can correspond to and/or be based at least in part on one or more of:
   only contention based RA if CFRA is not supported by 2-step RA.
   only contention free RA in 2-step RA
   both contention based RA and contention free RA in 2-step RA
This allows wireless device 22 to perform, such as via processing circuitry 84 and/or RA unit 34, a subsequent msgA attempt more quickly, if the previous msgA was not successful to achieve attachment. The standardization code may be as follows:

```
scalingFactorBI            ENUMERATED {zero, dot25, dot5, dot75}
OPTIONAL, -- Need R
```

Separate Timing Table is Used with Some Short Time Duration Included

In one or more embodiments, a separate timing table can be introduced for the backoff timing configuration for 2-step RA. The timing table may be stored in memory 72 of network node 16 and/or memory 88 of wireless device 22. For example, some small values (compared to other values in existing tables) can be included in the table to prioritize the backoff of the 2-step RA.

| Index | Backoff Parameter value (ms) |
|-------|------------------------------|
| 0 | 5 |
| 1 | 10 |
| 2 | 20 |
| 3 | 30 |
| 4 | 40 |
| 5 | 60 |
| 6 | 80 |
| 7 | 100 |
| 8 | 120 |
| 9 | 140 |
| 10 | 160 |
| 11 | 180 |
| 12 | 200 |
| 13 | 240 |
| 14 | Reserved |
| 15 | Reserved |

Therefore, the present disclosure provides for prioritized RACH for 2-step RACH msgA, where the msgA is composed of the random access preamble part and the PUSCH part.

SOME EXAMPLES

Example A1. A network node 16 configured to communicate with a wireless device 22 (WD 22), the network node 16 configured to, and/or comprising a radio interface 62 and/or comprising processing circuitry 68 configured to: participate in prioritized 2-step random access channel (RACH) signaling.

Example A2. The network node 16 of Example A1, wherein the prioritized 2-step RACH signaling includes message A and message B, message A including a random access preamble part and an uplink shared channel part.

Example A3. The network node 16 of Example A1, wherein the prioritized 2-step RACH signaling corresponds to a power ramping configuration separate from 4-step RACH signaling, the prioritized 2-step RACH signaling using a larger power step size than the 4-step RACH signaling.

Example A4. The network node 16 of Example A1, wherein the prioritized 2-step RACH signaling uses a different power step size than non-prioritized 2-step RACH signaling and 4-step RACH signaling.

Example A5. The network node 16 of Example A1, wherein the prioritized 2-step RACH signaling is associated with a power backoff time that is scaled based at least in part on a backoff timing used in 4-step contention free radio access.

Example B1. A method implemented in a network node 16 configured to communicate with a wireless device 22, the method comprising participate in prioritized 2-step random access channel (RACH) signaling.

Example B2. The method of Example B1, wherein the prioritized 2-step RACH signaling includes message A and message B, message A including a random access preamble part and an uplink shared channel part.

Example B3. The method of Example B 1, wherein the prioritized 2-step RACH signaling corresponds to a power ramping configuration separate from 4-step RACH signaling, the prioritized 2-step RACH signaling using a larger power step size than the 4-step RACH signaling.

Example B4. The method of Example B1, wherein the prioritized 2-step RACH signaling uses a different power step size than non-prioritized 2-step RACH signaling and 4-step RACH signaling.

Example B5. The method of Example B1, wherein the prioritized 2-step RACH signaling is associated with a power backoff time that is scaled based at least in part on a backoff timing used in 4-step contention free radio access.

Example C1. A wireless device 22 (WD 22) configured to communicate with a network node 16, the WD 22 configured to, and/or comprising a radio interface 82 and/or processing circuitry 84 configured to participate in prioritized 2-step random access channel (RACH) signaling for performing a random access procedure.

Example C2. The WD 22 of Example C1, wherein the prioritized 2-step RACH signaling includes message A and message B, message A including a random access preamble part and an uplink shared channel part.

Example C3. The WD 22 of Example C1, wherein the prioritized 2-step RACH signaling corresponds to a power ramping configuration separate from 4-step RACH signaling, the prioritized 2-step RACH signaling using a larger power step size than the 4-step RACH signaling.

Example C4. The WD 22 of Example C1, wherein the prioritized 2-step RACH signaling uses a different power step size than non-prioritized 2-step RACH signaling and 4-step RACH signaling.

Example C5. The WD 22 of Example C1, wherein the prioritized 2-step RACH signaling is associated with a power backoff time that is scaled based at least in part on a backoff timing used in 4-step contention free radio access.

Example D1. A method implemented in a wireless device 22 (WD 22), the method comprising participating in prioritized 2-step random access channel (RACH) signaling for performing a random access procedure.

Example D2. The method of Example D1, wherein the prioritized 2-step RACH signaling includes message A and message B, message A including a random access preamble part and an uplink shared channel part.

Example D3. The method of Example D1, wherein the prioritized 2-step RACH signaling corresponds to a power ramping configuration separate from 4-step RACH signaling, the prioritized 2-step RACH signaling using a larger power step size than the 4-step RACH signaling.

Example D4. The method of Example D1, wherein the prioritized 2-step RACH signaling uses a different power step size than non-prioritized 2-step RACH signaling and 4-step RACH signaling.

Example D5. The method of Example D1, wherein the prioritized 2-step RACH signaling is associated with a power backoff time that is scaled based at least in part on a backoff timing used in 4-step contention free radio access.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

CBRA Contention Based Random Access
CFRA Contention Free Random Access
DFTS-OFDM Discrete Fourier Transformation-Orthogonal Frequency Demultiplexing
MA Multiple Access
NR New radio
NW Network
OFDM Orthogonal Frequency Demultiplexing
PO PUSCH Occasion
PRACH Physical Random Access Channel
PUSCH Physical Uplink Shared Channel
RA Random Access
RACH Random Access Channel
RAR Random Access Response
RO PRACH Occasion (or RACH occasion)
RU Resource Unit
SCS Subcarrier Spacing
SIB1 System Information Block Type 1
TF Timing and Frequency
URLLC Ultra-Reliable and Low-Latency Communication It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented by a network node that is configured to communicate with a wireless device, the method comprising:

transmitting a first random access channel, RACH, configuration for prioritized 2-step random access, RA, signaling, the first RACH configuration including at least a power ramping step for power ramping at least one of a preamble part and physical uplink shared channel, PUSCH, part of a message A, msgA, of the prioritized 2-step RA signaling;

transmitting a second RACH configuration for non-prioritized 2-step RA signaling, the second RACH configuration being separately configured from the first RACH configuration, the power ramping step of the first RACH configuration having a larger power step size than a power step size of the second RACH configuration; and performing the prioritized 2-step RA signaling using the first RACH configuration based on a traffic type associated with data to be transmitted by the wireless device.

2. The method claim 1, wherein the first RACH configuration for prioritized 2-step RA signaling includes a scaling factor for a backoff indicator.

3. The method of claim 2, wherein the scaling factor of the first RACH configuration corresponds to a shorter time window from which to select a backoff time than a time window for selecting a backoff time in the second RACH configuration for the RA signaling.

4. The method of claim 1, wherein the transmission of the first RACH configuration corresponds to broadcasting the first RACH configuration in a system information block (SIB).

5. The method of claim 1, wherein the first RACH configuration is configured for contention free based random access; and the second RACH configuration is configured for contention based random access.

6. A method implemented by a wireless device that is configured to communicate with a network node, the method comprising:

receiving a first random access channel, RACH, configuration for prioritized 2-step random access, RA, signaling, the first RACH configuration including at least a power ramping step for power ramping a preamble part and physical uplink shared channel, PUSCH, part of a message A, msg A, of the prioritized 2-step RA signaling;

receiving a second RACH configuration for non-prioritized 2-step RA signaling, the second RACH configuration being separately configured from the first RACH configuration, the power ramping step of the first RACH configuration having a larger power step size than a power step size of the second RACH configuration;

determining whether to use the first RACH configuration for prioritized 2-step random access, RA, signaling or the second RACH configuration for non-prioritized 2-step RA signaling for transmitting data based on a traffic type associated with the data; and performing prioritized 2-step RA signaling using the first RACH configuration based on the determination.

7. The method of claim 6, wherein the first RACH configuration for prioritized 2-step RA signaling includes a scaling factor for a backoff indicator.

8. The method of claim 7, wherein the scaling factor of the first RACH configuration corresponds to a shorter time window from which to select a backoff time than a time window for selecting a backoff time in the second RACH configuration for the RA signaling.

9. The method of claim 6, wherein the first RACH configuration is received in a broadcast of a system information block (SIB).

10. The method of claim 6, wherein the first RACH configuration is configured for contention free based random access; and the second RACH configuration is configured for contention based random access.

11. A network node configured to communicate with a wireless device, the network node comprising:

processing circuitry configured to:

transmit a first random access channel, RACH, configuration for prioritized 2-step random access, RA, signaling, the first RACH configuration including at least a power ramping step for power ramping at least one of a preamble part and physical uplink shared channel, PUSCH, part of a message A, msgA, of the prioritized 2-step RA signaling;

transmit a second RACH configuration for non-prioritized 2-step RA signaling, the second RACH configuration being separately configured from the first RACH configuration, the power ramping step of the first RACH configuration has a larger power step size than a power step size of the second RACH configuration; and perform the prioritized 2-step RA signaling using the first RACH configuration based a traffic type associated with data to be transmitted by the wireless device.

12. The network node according to claim 11, wherein the first RACH configuration for prioritized 2-step RA signaling includes a scaling factor for a backoff indicator.

13. A wireless device configured to communicate with a network node, the wireless device comprising:

processing circuitry configured to:

receive a first random access channel, RACH, configuration for prioritized 2-step random access, RA, signaling, the first RACH configuration including at least a power ramping step for power ramping a preamble part and physical uplink shared channel, PUSCH, part of a message A, msgA, of the prioritized 2-step RA signaling;

receive a second RACH configuration for non-prioritized 2-step RA signaling, the second RACH configuration being separately configured from the first RACH configuration, the power ramping step of the first RACH configuration having a larger power step size than a power step size of the second RACH configuration;

determine whether to use the first RACH configuration for prioritized 2-step random access, RA, signaling or the second RACH configuration for non-prioritized 2-step RA signaling for transmitting data based on a traffic type associated with the data; and perform prioritized 2-step RA signaling using the first RACH configuration based on the determination.

14. The wireless device according to claim 13, wherein the first RACH configuration for prioritized 2-step RA signaling includes a scaling factor for a backoff indicator.

* * * * *